J. S. STONE.
APPARATUS FOR DETERMINING THE DIRECTION OF SPACE TELEGRAPH SIGNALS.
APPLICATION FILED AUG. 17, 1906.

899,272.

Patented Sept. 22, 1908.

J. S. STONE.
APPARATUS FOR DETERMINING THE DIRECTION OF SPACE TELEGRAPH SIGNALS.
APPLICATION FILED AUG. 17, 1906.

899,272.

Patented Sept. 22, 1908.
2 SHEETS—SHEET 2.

WITNESSES:
Patrick J. Conroy
G. A. Higgins

INVENTOR:
John Stone Stone
by Browne & Woodworth
Attys.

UNITED STATES PATENT OFFICE.

JOHN STONE STONE, OF CAMBRIDGE, MASSACHUSETTS, ASSIGNOR TO WILLIAM W. SWAN, TRUSTEE, OF BROOKLINE, MASSACHUSETTS.

APPARATUS FOR DETERMINING THE DIRECTION OF SPACE-TELEGRAPH SIGNALS.

No. 899,272.      Specification of Letters Patent.      Patented Sept. 22, 1908.

Application filed August 17, 1906. Serial No. 330,964.

*To all whom it may concern:*

Be it known that I, JOHN STONE STONE, a citizen of the United States, and a resident of Cambridge, in the county of Middlesex and State of Massachusetts, have invented a new and useful Improvement in Apparatus for Determining the Direction of Space-Telegraph Signals, of which the following is a specification.

My invention relates to the art of signaling electrically between stations not connected by a conducting wire.

The object of my invention is to provide a system whereby the bearing or direction of the transmitting system from the receiving system may be determined by observing at the receiving system the direction of motion of the electromagnetic waves which emanate from the transmitting system.

The present invention is a development and extension of that described in my U. S. Letters Patent No. 716,135, dated Dec. 16, 1902, to which reference may be had for a more complete explanation of the principles involved than need be set forth herein.

The drawings which accompany and form a part of this specification illustrate in diagram several embodiments of my invention, although it will be understood that many modifications may be made therein by those skilled in the art without departing from the principles of my invention.

Figure 1:
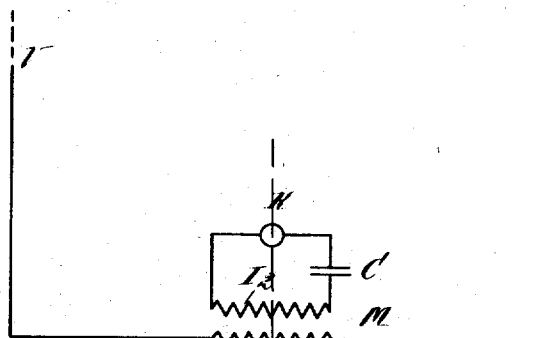
Figure 2:
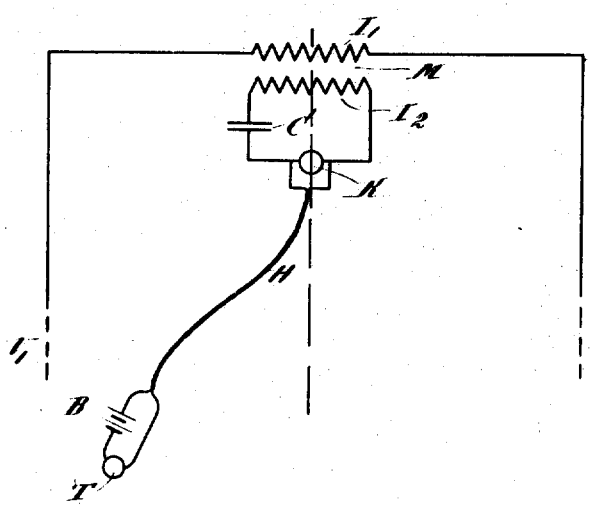
Figure 3:
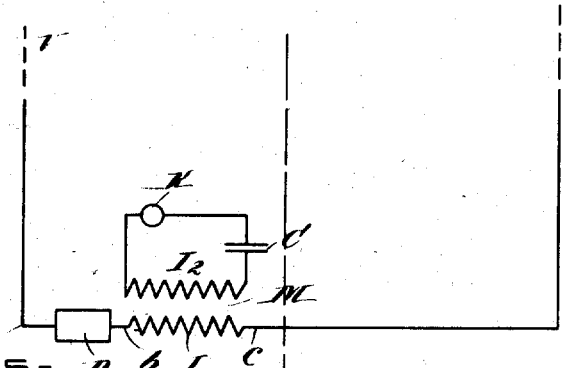
Figure 4:
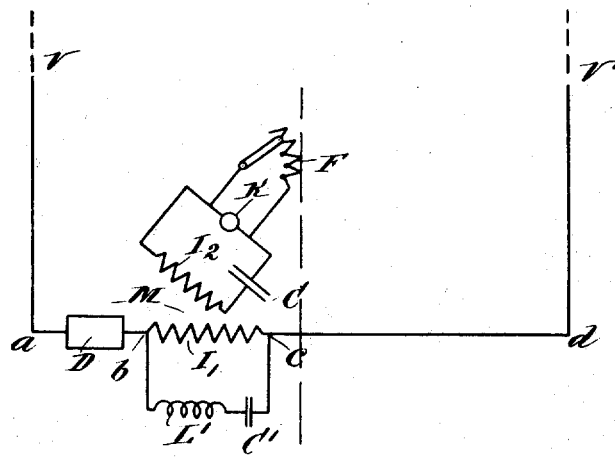
Figure 5:
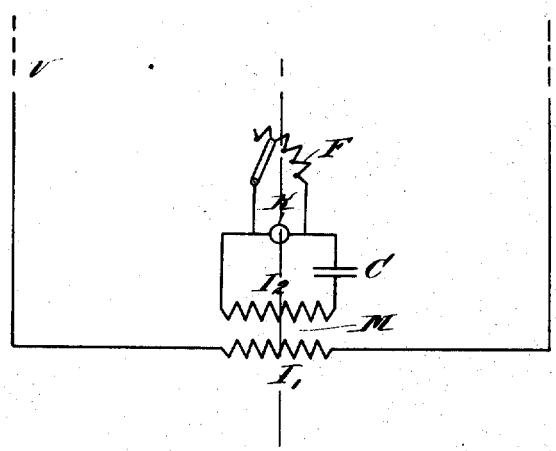
Figure 6:
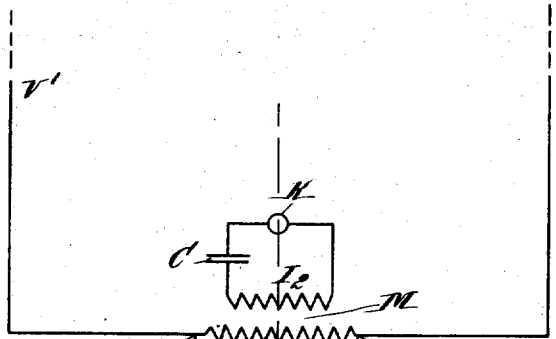

In the drawings Figure 1 represents a space telegraph receiving system constructed in accordance with the present invention. Fig. 2 is a modification of the system shown in Fig. 1. Fig. 3 shows a further modification in which the receiver circuit need not be symmetrically placed with respect to the elevated conductors. Fig. 4 shows another modification in which the response of the oscillation detector may be varied in accordance with the amplitude of the received waves. Fig. 5 represents still another modification. Fig. 6 shows a means for preventing the receiving system from responding to extraneous electrical forces not intended to be received.

In the figures, V V' represent upwardly-extending elevated receiving conductors.

$V_1$ $V_1'$ represent downwardly-extending elevated receiving conductors.

C C' are condensers.

M is a transformer of which $I_1$ and $I_2$ are the primary and secondary windings.

K is an oscillation detector.

L' is an inductance, and D is an artificial line.

The elevated conductors V, V' are connected at their lower ends by the conductor which includes means for associating the oscillation detector therewith and which in the present instance is shown as the primary of the transformer M. The circuit which includes the secondary of said transformer preferably is arranged so that it may be attuned to the frequency of the waves the energy of which is to be received, as for example by varying the capacity of the condenser C. The oscillation detector K may be of any suitable type and may be associated with the receiving circuit in any suitable manner, being shown in the present instance as included in series therewith.

The system of elevated conductors in all cases may be so constructed, as by mounting the same on a suitable support, as to be capable of rotation about a vertical axis. When used on ship board one of the elevated conductors will be connected to a support on the forward part of the ship and the other to a support on the after part thereof, and in this case in the operation of determining the bearing of the transmitting station the plane of the conductors will be shifted by swinging the ship. When the plane of said conductors is normal to the direction of motion of the transmitted waves, the effect of the oscillations created by said waves in the system of elevated conductors will be *nil* and accordingly by appropriately swinging the ship the operator may determine by means of the sounds in the usual receiving telephone associated with the oscillation detector K, the direction of motion of the received waves. In all the figures, the system of elevated conductors is ungrounded, and when the plane of said conductors is normal to the direction of motion of the transmitted waves, the potential of the system as a whole is elevated and depressed without producing a difference of potential between the terminals of the transformer primary, and therefore without creating currents in the transformer secondary.

In Fig. 1, the transformer M is symmetrically placed with respect to the conductors V, V', thereby governing the location of the receiving operator with respect to the ship. It is not always convenient, however, that the operator and his apparatus should be located in the middle of the ship, and accordingly in Figs. 2 and 3 I have shown systems in which the receiving operator may be located in a more convenient position in accordance with the construction and arrangement of the ship upon which the apparatus is to be used.

In Fig. 2 the receiving conductors extend downwardly and their upper ends are connected by the conductor which includes the means for associating the oscillation detector therewith and which in the present case is shown as the primary of the transformer M. H represents a pair of twisted conductors connecting the oscillation detector K with the telephone T and source of electrical energy B, if the receiver is of such character as to require such source. By twisting the conductors H as shown, direct induction effects by received waves or other electrical forces are obviated. By this construction it will be obvious that the receiving operator may locate himself in any convenient portion of the ship.

In Fig. 3 the means for associating the oscillation detector with the system of elevated conductors is not symmetrically placed with respect to said conductors, but divides the conductor $a\,d$ into two equal parts $ab$ and $cd$. To render these parts electrical equivalents I include in one of said unequal parts of the conductor $a\,d$, herein shown as the shorter part $ab$, an artificial line so constructed as to bring the center of oscillation of the system as a whole approximately midway between the points $b$ and $c$. It will be obvious by this arrangement that the transformer M may be placed anywhere between the points $a$ and $d$ and that therefore the receiving circuit may be located at any desired portion of the ship. As is well understood, the amplitude of the sounds produced in the receiving telephone associated with the oscillation detector depends, other things being equal, upon the amplitude of the waves received. Inasmuch as the success of the method herein disclosed of determining the bearing of a ship with respect to a transmitting system depends greatly upon the skill of the operator and the nicety of the adjustments of the apparatus, and inasmuch as the varying amplitudes of the sounds produced in the telephone by waves which differ in energy render such adjustments more difficult, I provide means for adjusting the response of the detector, and consequently the loudness of the sounds produced by the telephone, with respect to the amplitude of the received waves, so that said sounds may be maintained at about uniform strength. An additional and valuable function of said means for adjusting the response of the detector is that by its use in the hands of a skilled operator in the habit of receiving signals from given shore stations, information of the approximate distance of the ship from a shore station, as well as the bearing of station, may be ascertained. In Fig. 4 the mutual inductance between the circuit which includes the oscillation detector and the rest of the system is made adjustable as by varying the separation or spatial relation of the windings of the transformer M. An adjustable shunt F may be connected across the terminals of the detector K. By both of these means the receiving operator may, other things being equal, maintain the sounds produced by the telephone at practically uniform intensity or otherwise control them. It will be obvious that either one of these means may be employed separately, and as shown in Fig. 5 the mutual inductance between the windings of the transformer M is maintained constant and the sounds in the telephone are controlled solely by the adjustable resistance F.

The systems herein disclosed are liable to be disarranged by atmospheric electricity or abrupt or impulsive electrical forces. Accordingly I may connect across the terminals of the primary $I_1$ a circuit including the inductance $L'$ and condenser $C'$ which are so adjusted that said circuit has a natural rate of vibration equal to the fundamental rate of vibration of the conductors $Vo$ and $V'o'$ considered as connected in series. Under these conditions the most pronounced natural rate of vibration of the system as a whole will be equal to that of its component parts $Vo$ and $V'o'$, considered as connected in series, and $o\,C'\,L'\,o'$. Abrupt or impulsive forces therefore will develop in the system oscillations having said rate of vibration and inasmuch as the circuit $o\,C'\,L'\,o'$ has zero reactance and practically zero impedance for said oscillations, the latter will be conducted around the primary $I_1$ and will not affect the receiver, as heretofore more fully disclosed by me. It will be understood of course that the protecting circuit $o\,C'\,L'\,o'$ may be employed in connection with any of the systems described herein.

I claim,—

1. A system of space telegraphy comprising a system of ungrounded elevated conductors capable of receiving the energy of electromagnetic waves and also capable of having its position changed relatively to the direction of motion of the electromagnetic waves, a conductor connecting said elevated conductors, means connected with said conductor and dividing the same into two unequal parts, an oscillation detector associated with said means, means for rendering the two parts of said conductor electrically equivalent, and means whereby said oscillation detector may indicate a signal only when said system of electrical conductors has a predetermined position relative to the direction of motion of said electromagnetic waves.

2. A system of space telegraphy comprising elevated receiving conductors, a conductor connecting said receiving conductors, means connected with said conductor and dividing the same into two unequal parts for associating an oscillation detector therewith, and an artificial line in one of said parts.

3. A system of space telegraphy comprising elevated receiving conductors, a conductor connecting said receiving conductors, means connected with said conductor and dividing the same into two unequal parts for associating an oscillation detector therewith, and means for rendering the two parts of said conductor electrically equivalent.

4. A system of space telegraphy comprising ungrounded elevated receiving conductors, a conductor connecting said receiving conductors, means connected with said conductor and dividing the same into two unequal parts for associating an oscillation detector therewith, and an artificial line in one of said parts.

5. A system of space telegraphy comprising ungrounded elevated receiving conductors, a conductor connecting said receiving conductors, means connected with said conductor and dividing the same into two unequal parts for associating an oscillation detector therewith, and means for rendering the two parts of said conductor electrically equivalent.

In testimony whereof, I have hereunto subscribed my name this 14th day of August 1906.

JOHN STONE STONE.

Witnesses:
C. STEWART FORBES,
GEO. K. WOODWORTH.